(12) United States Patent
Farkas et al.

(10) Patent No.: US 12,238,535 B2
(45) Date of Patent: *Feb. 25, 2025

(54) METHODS, SYSTEMS, AND COMPUTER PROGRAM PRODUCTS FOR OPTIMIZING A PREDICTIVE MODEL FOR MOBILE NETWORK COMMUNICATIONS BASED ON HISTORICAL CONTEXT INFORMATION

(71) Applicant: Signal Decode, Inc., Peterborough, NH (US)

(72) Inventors: Joseph Farkas, Merrimack, NH (US); Brandon Hombs, Merrimack, NH (US); Barry West, Temple, NH (US)

(73) Assignee: Signal Decode, Inc., Peterborough, NH (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/403,144

(22) Filed: Aug. 16, 2021

(65) Prior Publication Data
US 2021/0377745 A1 Dec. 2, 2021

Related U.S. Application Data

(63) Continuation of application No. 15/967,379, filed on Apr. 30, 2018, now Pat. No. 11,096,063, which is a
(Continued)

(51) Int. Cl.
*H04W 16/22* (2009.01)
*G06N 5/04* (2023.01)
(Continued)

(52) U.S. Cl.
CPC ............ *H04W 16/22* (2013.01); *G06N 5/048* (2013.01); *H04W 24/08* (2013.01)

(58) Field of Classification Search
CPC ....... G06N 5/048; H04W 16/22; H04W 24/08
See application file for complete search history.

(56) References Cited

U.S. PATENT DOCUMENTS 6,466,797 B1* 10/2002 Frodigh ............... H04W 24/00
455/430
6,625,465 B1* 9/2003 Moon ................... H04W 52/24
455/69

(Continued)

OTHER PUBLICATIONS

Wolski, "Forecasting Network Performance to Support Dynamic Scheduling Using the Network Weather Service", IEEE, 1997, pp. 316-325 (Year: 1997).*

(Continued)

*Primary Examiner* — Paulinho E Smith
(74) *Attorney, Agent, or Firm* — NK Patent Law

(57) ABSTRACT

Methods and systems are described for optimizing a predictive model for mobile network communications based on historical context information. In one aspect, historical context information is collected including at least one of communication environment, communication parameter estimates, mobile device statistics, mobile device transmit settings, base station receiver settings, past network statistics and settings, and adjacent network node information statistics and settings, the historical context information including data from communications of at least one mobile device. A predictive model for network communications is determined based on the historical context information. A communication context for a first mobile device different than the at least one mobile device is determined. The first device is scheduled and/or network parameters are set based on the determined predictive model and communication context.

20 Claims, 3 Drawing Sheets

Related U.S. Application Data continuation of application No. 14/448,435, filed on Jul. 31, 2014, now Pat. No. 9,961,560.

(51) Int. Cl.
*G06N 5/048* (2023.01)
*H04W 24/08* (2009.01)

(56) References Cited

U.S. PATENT DOCUMENTS

| | | | | |
|---|---|---|---|---|
| 7,243,054 B2* | 7/2007 | Rappaport | ............ | H04W 16/20 703/2 |
| 7,496,648 B2 | 2/2009 | Manion et al. | | |
| 8,102,784 B1 | 1/2012 | Lemkin et al. | | |
| 9,398,598 B2* | 7/2016 | Garrett | ................. | H04L 1/0003 |
| 2005/0163072 A1* | 7/2005 | Park | ...................... | H04L 47/626 370/332 |
| 2007/0002765 A1* | 1/2007 | Kadaba | ................. | H04L 47/823 370/254 |
| 2008/0175185 A1* | 7/2008 | Ji | ....................... | H04W 52/247 370/318 |
| 2008/0225811 A1* | 9/2008 | Wentink | ............... | H04L 1/1671 370/338 |
| 2010/0323712 A1* | 12/2010 | Guey | .................... | H04W 72/20 455/452.2 |
| 2012/0087435 A1* | 4/2012 | Gomadam | ........... | H04B 7/0632 375/285 |
| 2012/0275327 A1* | 11/2012 | Zangi | ....................... | H04L 1/02 370/252 |
| 2012/0315916 A1* | 12/2012 | Van Phan | ............. | H04W 36/08 455/442 |
| 2013/0308470 A1 | 11/2013 | Bevan et al. | | |
| 2014/0192673 A1* | 7/2014 | Li | ......................... | H04B 7/024 370/252 |
| 2014/0211644 A1* | 7/2014 | Giannakis | ............. | H04W 16/14 370/252 |
| 2014/0222321 A1* | 8/2014 | Petty | ..................... | G08G 1/012 701/533 |
| 2014/0313908 A1* | 10/2014 | da Silva | .................. | H04W 4/70 370/252 |
| 2015/0085679 A1* | 3/2015 | Farkas | .................. | H04L 5/0051 370/252 |
| 2015/0111593 A1* | 4/2015 | Farkas | ................ | H04W 72/541 455/452.2 |
| 2015/0358063 A1* | 12/2015 | Farkas | .................. | H04B 7/024 375/267 |
| 2015/0379423 A1* | 12/2015 | Dirac | ..................... | G06N 20/00 706/12 |
| 2016/0034823 A1* | 2/2016 | Farkas | .................. | H04W 16/22 706/14 |
| 2016/0119261 A1* | 4/2016 | Ghafourifar | ............ | H04L 51/56 709/206 |
| 2016/0183130 A1* | 6/2016 | Farkas | .................. | H04W 72/12 455/436 |
| 2017/0111803 A1* | 4/2017 | Moritz | ................. | H04W 16/18 |
| 2017/0124487 A1* | 5/2017 | Szeto | ................. | G06F 11/1448 |

OTHER PUBLICATIONS

Sang et al., "Coordinated Load Balancing, Handoff/Cell-site Selection, and Scheduling in Multi-Cell Packet Data Systems", 2004, pp. 302-314 (Year: 2004).*

USPTO, Non-Final Office Action in U.S. Appl. No. 14/448,435 dated Jul. 13, 2017, 24 pages.

USPTO, Non-Final Office Action in U.S. Appl. No. 15/967,379 dated Nov. 27, 2020, 9 pages.

* cited by examiner

METHODS, SYSTEMS, AND COMPUTER PROGRAM PRODUCTS FOR OPTIMIZING A PREDICTIVE MODEL FOR MOBILE NETWORK COMMUNICATIONS BASED ON HISTORICAL CONTEXT INFORMATION

RELATED APPLICATIONS

This application is a continuation of U.S. Non-Provisional patent application Ser. No. 15/967,379 filed on Apr. 30, 2018, issuing as U.S. Pat. No. 11,096,063 on Aug. 17, 2021, titled "METHODS, SYSTEMS, AND COMPUTER PROGRAM PRODUCTS FOR OPTIMIZING A PREDICTIVE MODEL FOR MOBILE NETWORK COMMUNICATIONS BASED ON HISTORICAL CONTEXT INFORMATION", which is a continuation of U.S. Non-Provisional patent application Ser. No. 14/448,435 filed on Jul. 31, 2014, issued as U.S. Pat. No. 9,961,560 on May 1, 2018, titled "METHODS, SYSTEMS, AND COMPUTER PROGRAM PRODUCTS FOR OPTIMIZING A PREDICTIVE MODEL FOR MOBILE NETWORK COMMUNICATIONS BASED ON HISTORICAL CONTEXT INFORMATION", and is related to U.S. Non-Provisional patent application Ser. No. 14/257,599 filed on Apr. 21, 2014, titled "Method and System for Improving Efficiency in a Cellular Communications Network", each of the entire disclosures of which is here incorporated by reference.

BACKGROUND

In modern wireless networks, scheduling and certain network parameters, such as power control parameters, require constant adaptation to maximize performance. Traditionally, simple algorithms are created in order to perform real time network optimization. For instance scheduling is often performed by measuring a signal-to-interference-plus-noise ratio (SINR) and then determining transmit parameters that achieve a certain spectral efficiency that is in line with that SINR, such as choosing a certain modulation and coding. Some more advanced systems include additional steps, such as adjusting the transmit parameters based on current error rates. Techniques like this and others to optimize network parameters are performed with these relatively simple steps. However, the actual factors in determining the best network settings are much more complex and involve many other known and potentially unknown factors. Additionally, these techniques rely on feedback from and between mobile devices and the base station, which is limited by both the amount and frequency of the feedback.

Accordingly, there exists a need for methods, systems, and computer program products for optimizing a predictive model for mobile network communications based on historical context information.

SUMMARY

Methods and systems are described for optimizing a predictive model for mobile network communications based on historical context information. In one aspect, historical context information is collected including at least one of communication environment, communication parameter estimates, mobile device statistics, mobile device transmit settings, base station receiver settings, past network statistics and settings, and adjacent network node information statistics and settings, the historical context information including data from communications of at least one mobile device. A predictive model for network communications is determined based on the historical context information. A communication context for a first mobile device different than the at least one mobile device is determined. The first mobile device is scheduled and/or network parameters are set based on the determined predictive model and communication context.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
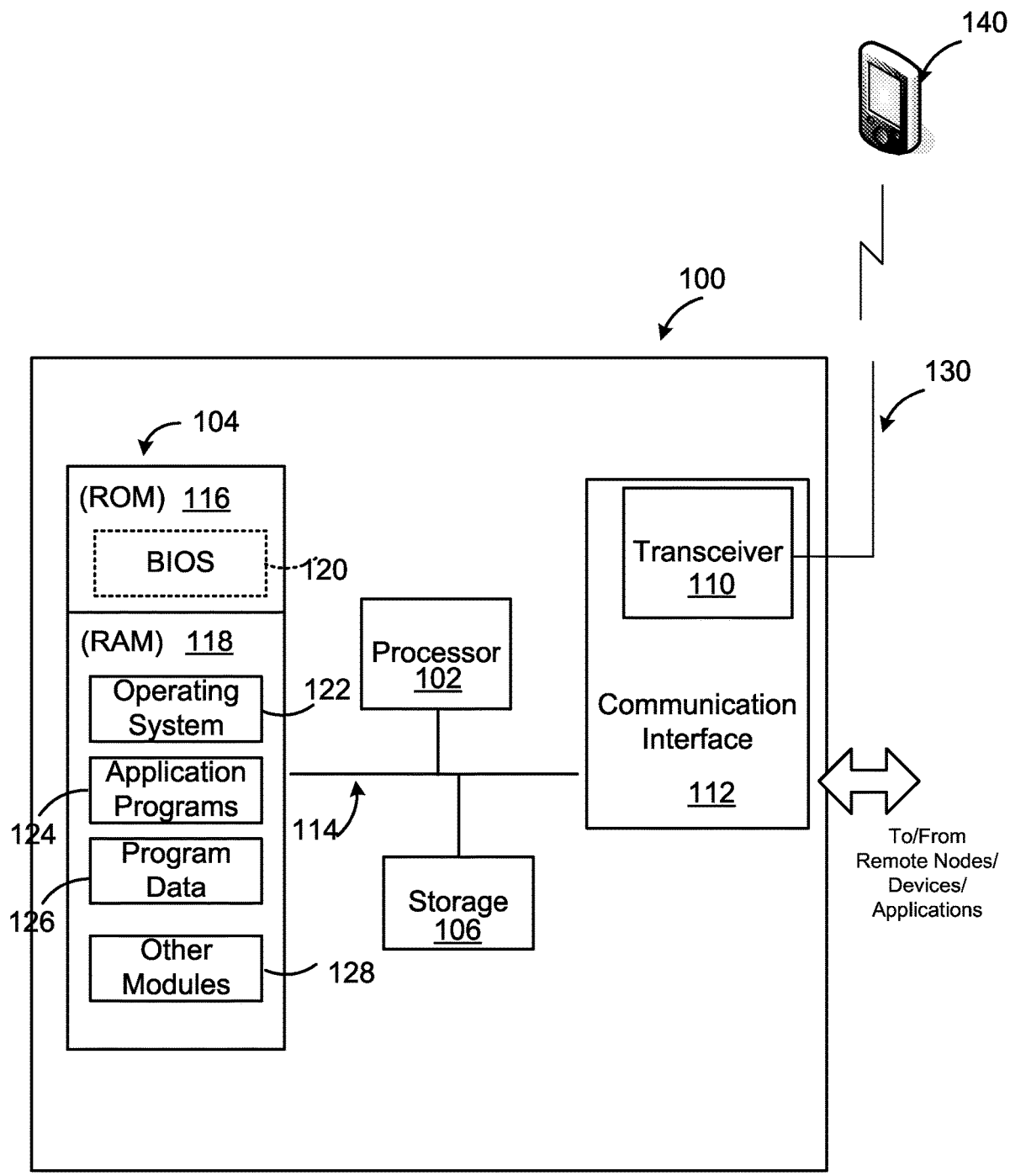
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Significant amounts of relevant information is available within a wireless network, which can include any communication system that is more than a single point-to-point link, including but not limited to the systems described above and include cellular networks, Wi-Fi, WiMAX, satellite communication networks, and ad-hoc networks. All of these networks operate within an environment with significant interference from other nodes in the network. Applying "big data" techniques to the available relevant network information can yield results that provide optimizations to the wireless network. The application of these techniques, referred to herein as network learning, takes advantage of the vast amounts of data generated in a wireless network in order to optimize data scheduling and/or network parameters, jointly referred to as real time network operations (RTNO). The network learning technique builds from a data store of historical context information, which includes, among others, a communication environment, communication parameter estimates, mobile device statistics, mobile device transmit settings, base station receiver settings, past network statistics and settings, and adjacent network node information statistics and settings, each discussed further below. The historical context information includes data from communications of multiple devices and/or base stations. The historical context information can then be processed in a network learning engine to build a predictive model that maps input data to expected results, providing for the RNTO.

The results obtained from the predictive model can then be validated by comparing the expected results from the predictions from the predictive model with actual results. The results of the validation can provide feedback such that the predictive model can be adjusted accordingly, thus allowing for improved prediction and adaptation to changing conditions.

While these techniques can be applied to any wireless network, hub-and-spoke networks with a stationary hub such as cellular networks, Wi-Fi, and WiMAX can benefit the most since each hub has access to significant data such that RTNO decisions that can be improved through network learning. A stationary hub is preferred because, since the hub location is known, there is one less variable thus requiring less historical context information due to the decreased number of degrees of freedom. Traditional hub-and-spoke networks have no or limited information shared between the hubs. In the case of a traditional cellular network, very little information is known about the real time operations at an adjacent cell.

All or a subset of the historical context information can be used to determine the predictive model. The trade-off for including more information in the data set is the possibility of applying irrelevant noise to the model, an increase in computation time, and increased information gathering and storage requirements. Using this big data approach, features that improve the network model can be employed that have not been traditionally used or were totally unpredictable before. In a traditional network, it is often challenging or impractical to get information about the other nodes in the network not associated with the hub. Including that information, however, in the predictive model improves results.

Many network settings within wireless networks are dynamic and must be adjusted in order to optimize the network. Network settings can include, for example, scheduling and power control, but generally also include anything else dynamic that may help optimize the network (e.g., handoff algorithms). Optimizing a network is typically an effort to maximize capacity of the network but may include other desired optimizations, such as minimizing latency, fairness, maximizing number of users, maximizing number of users with a minimum rate constraint, minimizing power consumption, minimizing error rate, determining optimal error rate, and others.

In one aspect, substantial amounts of historical context information for all cells of a cellular network are known, such as through central processing via a cloud radio access network, coordinated multi-point, or if extremely high throughput, low latency links exist between cells. In another aspect, the predictive model, through network learning, verification, and adjustment, provides a multi-cell model where joint decisions are made across multiple cells.

The improvements over traditional RTNO techniques come from better RTNO settings due to following a more complex rule set that takes into account more parameters than traditional approaches and the predictive nature of the approach. The predictive model is in effect recognizing patterns and determining where those patterns lead. The patterns can occur from algorithms following a defined rule set in the adjacent cells or from physical constructs such as a communicating mobile device traveling along a road.

By way of a simple example for determining an uplink SINR estimate for scheduling purposes, assume a noise level is known but the signal power and the interference levels are unknown. The signal power would traditionally be obtained by using prior reference signals to obtain signal power estimates and the interference level would traditionally be obtained by averaging past interference levels. Using instead a predictive model that is based on a complex set of historical context information, however, the predictive model will have mapped historical context information, such as, mobile device locations, velocity, power levels, and past interference levels associated with time and frequency, for the same cell to a resulting SINR. Prior power estimates based on reference signals are not needed with this approach. Additionally the interference can be estimated better by taking into account interference over time and frequency and, through network learning, determining a predictive model that can provide the best prediction of future interference. Unexpected but repeatable patterns can emerge because the scheduling algorithms in adjacent cells are not random but governed by a strict set of rules.

In another example, a pattern is detected in which received power is linearly increasing. The predictive model determined will identify this as a trend and, in effect, "predict" into the future that received power will continue to increase. As a result, an associated mobile device will be schedule and/or the network parameters will be set into the future in accordance with that trend.

Figure 2:
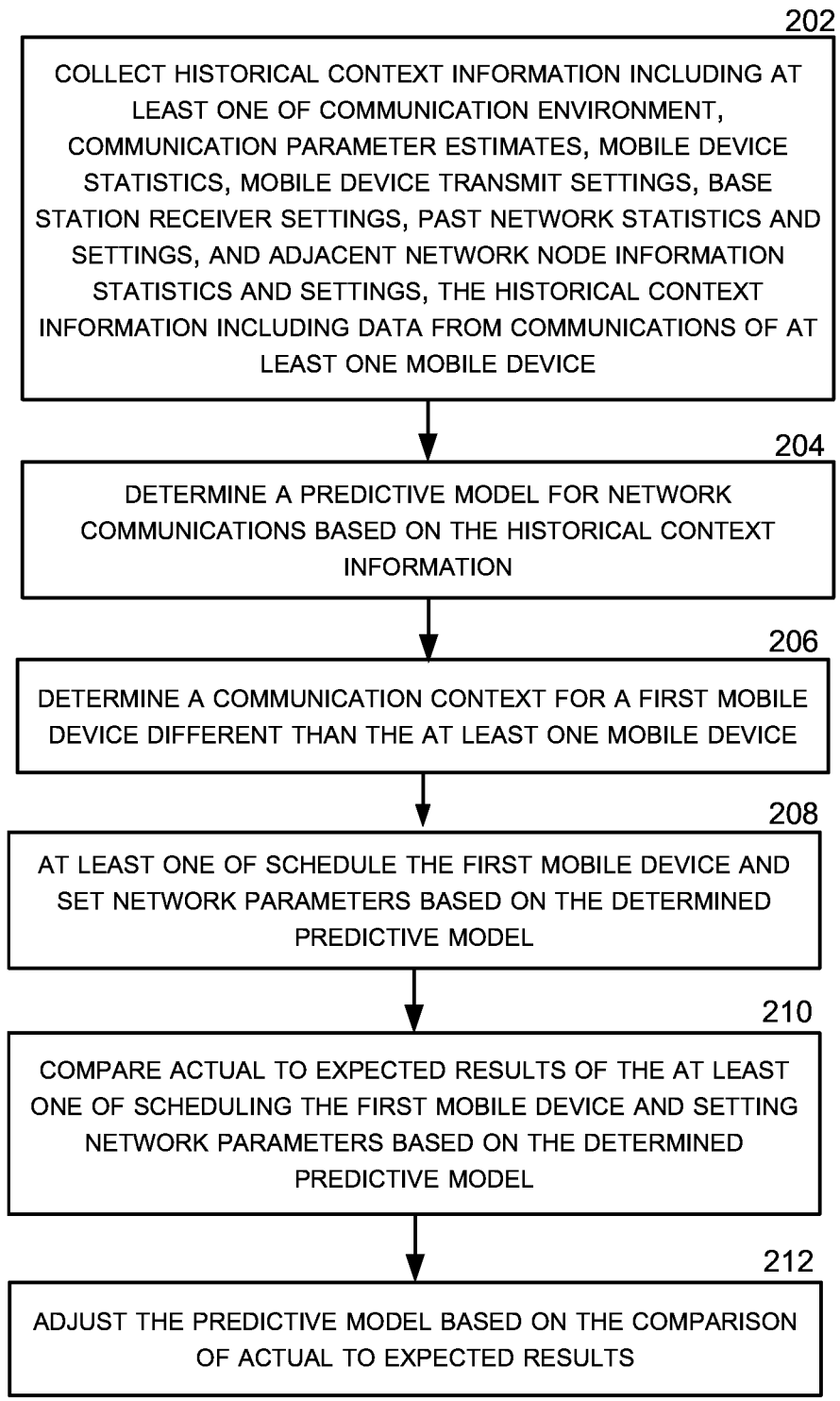
FIG. 2 is a flow diagram illustrating a method for optimizing a predictive model for mobile network communications based on historical context information according to an aspect of the subject matter described herein.
Figure 3:
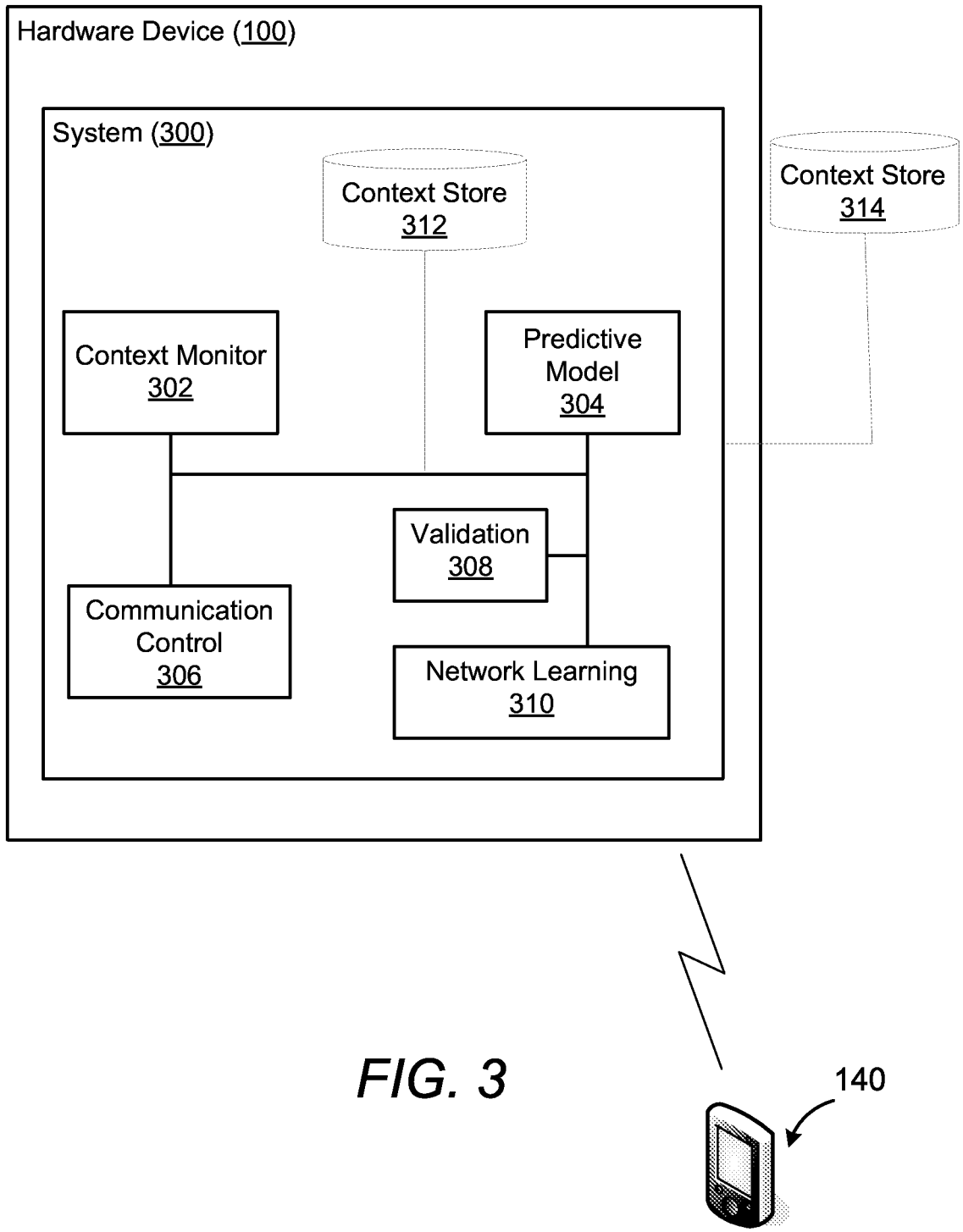
FIG. 3 is a block diagram illustrating an arrangement of components for optimizing a predictive model for mobile network communications based on historical context information according to another aspect of the subject matter described herein.

Turning now to FIG. 2, a flow diagram is shown illustrating a method for optimizing a predictive model component 304 for mobile network communications based on historical context information according to an exemplary aspect of the subject matter described herein. FIG. 3 is a block diagram illustrating an arrangement of components for optimizing a predictive model component 304 for mobile network communications based on historical context information according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in a compatible execution environment, such as the environment provided by some or all of the components of the arrangement in FIG. 1. For example, the arrangement of components in FIG. 3 may be implemented by some or all of the components of the hardware device 100 of FIG. 1.

With reference to FIGS. 2 and 3, in block 202, historical context information is collected including at least one of communication environment, communication parameter estimates, mobile device statistics, mobile device transmit settings, base station receiver settings, past network statistics and settings, and adjacent network node information statistics and settings. The historical context information includes data from communications of at least one mobile device.

Accordingly, a system for optimizing a predictive model for mobile network communications based on historical context information includes means for collecting historical context information. For example, as illustrated in FIG. 3, a context monitor component 302 is configured to collect the historical context information.

The historical communication context is prior communication contexts that have been monitored by context monitor component 302 and stored in a local context store 312 and/or a remote context store 314. Note that context stores 312 and 314 are illustrated as optional components of system 300 because, while system 300 accesses one or more of the context store(s) 312 and 314, the context stores 312 and 314 may or may not be part of system 300.

In one aspect, the context monitor component 302 can be configured to collect communication environment factors that include at least one of weather factors, time of day, day of week, season, geography, and obstructions in a communication path. For example, the context monitor component 302 can communicate with a weather service provider or a local or remote weather monitor to monitor and store weather factors. Similarly, the context monitor component 302 can determine from remote services or from local or remote monitors or data stores a time of day, day of week, season, geography, and/or obstructions in a communication path.

In another aspect, the context monitor component 302 can be configured to collect communication parameter estimates that include at least one of delay spread, channel taps, channel power, received signal strength, number of channel taps, channel coherence time, and channel coherence bandwidth.

In another aspect, the context monitor component 302 can be configured to collect mobile device statistics that include at least one of signal to noise ratio, signal to interference plus noise ratio, interference plus noise ratio, bit error rate, channel bit error rate, packet error rate, block error rate, location information, mobile device velocity, mobile device acceleration, number of antennas, traffic types, and buffer size.

In another aspect, the context monitor component 302 can be configured to collect mobile device transmit settings that include at least one of transmit power, bandwidth, modulation, coding, spreading length, spreading code, scheduling information, frequency, power control, beam patterns, and precoding matrices.

In another aspect, the context monitor component 302 can be configured to collect base station receiver settings that include at least one of receiver algorithm selection and receiver parameter settings.

In another aspect, the context monitor component 302 can be configured to collect historical communication context as a sequence of historical communication contexts. The stored historical communication context can include a sequence of previous communication contexts for a particular mobile device 104 or for multiple mobile devices related based on some aspect of the communication context or by another aspect. In an aspect, the context monitor component 302 can be configured to collect historical communication context for at least one of intra-cell and inter-cell mobile devices.

In another aspect, the context monitor component 302 can be configured to collect historical communication context via at least one of a drive test, from a test mobile device, from one or more active mobile devices, from a simulation, from a test base station, from one or more active base stations, and through central processing via a cloud radio access network, via coordinated multi-point, or via high throughput, low latency links between cells. Accordingly, the historical context information can come from simulations or real network data. The network learning can be based on either or a combination of the two.

In another aspect, the context monitor component 302 can be configured to determine a type of historical context information collected based on a communication throughput between a base station serving the first mobile device and at least one other base station. For example, where there is either no link between the cells or the link between the cells is insufficient to send significant useful information between the cells, the historical context information collected may be limited to information for the immediate cell. Where there is a usable link but with somewhat limited throughput between the cells, the historical context information collected may be limited to only certain kinds of historical context information (such as one or more of communication environment, communication parameter estimates, mobile device statistics, mobile device transmit settings, base station receiver settings, past network statistics and settings, and adjacent network node information statistics and settings) based on the needs of the model and the throughput. Where there is a high throughput link, any or all historical context information for other cells can be collected.

Other or more specific historical context information collected (a non-exhaustive list) can include network information, such as information about other cells (e.g., other cell locations or network settings), interference information, such as average interference levels, subspace identification of interference techniques (e.g., independent component analysis, principal component analysis, sample matrix inversion, angle of arrival), and radio bearer assignments, and performance information related to the success of scheduled data (e.g., CBER, BER, SINR, SNR, spectral efficiency, throughput, packet error rate). The interference information can be associated per user by user ID, network identifier, or through an identified subspace. Additionally, the knowledge of an effect on another cell can be included in information shared and made a metric within the network learning.

Returning to FIG. 2, in block 204 a predictive model for network communications is determined based on the historical context information. Accordingly, a system for optimizing a predictive model for mobile network communications based on historical context information includes means for determining a predictive model component 304 for network communications based on the historical context information. For example, as illustrated in FIG. 3, a predictive model component 304 is configured to determine a predictive model for network communications based on the historical context information.

In one aspect, the predictive model component 304 is configured to determine a predictive model based on detected patterns in the collected historical communication contexts as described above.

In another aspect, the predictive model component 304 can be configured to determine a predictive model for network communications based on the historical context information by determining a different predictive model for each cell in a cellular communication system. For example, the model may be different for different cells due to the physical difference between environments in the cells.

In another aspect, the predictive model component 304 can be configured to determine the predictive model to at least one of maximize capacity of an associated communication network, minimize latency in the network, provide fairness as between users of the network, maximize a number of users of the network, maximize a number of users of the network with a minimum rate constraint, minimize power consumption of a user device, minimize power consumption of a network device, minimize an error rate, and determine an optimal error rate.

Returning to FIG. 2, in block 206 a communication context for a mobile device different than the at least one mobile device is determined. For example, a communication context for a mobile device that is establishing communication or continued communication can be determined. Accordingly, a system for optimizing a predictive model for mobile network communications based on historical context information includes means for determining a communication context for a mobile device different than the at least one mobile device. For example, as illustrated in FIG. 3, a context monitor component 302 is configured to determine a communication context for a mobile device different than the at least one mobile device.

Returning to FIG. 2, in block 208 the first mobile device is scheduled and/or network parameters are set based on the determined predictive model. Accordingly, a system for optimizing a predictive model for mobile network communications based on historical context information includes means for at least one of scheduling the first mobile device and setting network parameters based on the determined predictive model. For example, as illustrated in FIG. 3, a communication control component 306 is configured to at least one of schedule the first mobile device and set network parameters based on the determined predictive model.

In one aspect, the communication control component 306 can be configured to at least one of schedule the first mobile device and set network parameters based on the determined predictive model by performing RTNO including setting at least one of scheduled time, scheduled frequency, modulation, coding, spreading code, number of layers, precoding matrix, transmit power level, closed loop power adjustments, antenna selection, and random backoff timer adjustments. For example, the communication control component 306, based on predictive model, can control a scheduling decision directly or can provide an input, such as the SINR, to a scheduling algorithm. The communication control component 306 can provide, based on the predictive model, any or all elements of a scheduling grant, power control, other network settings or data used for prediction in these algorithms. The provided elements can be related to either the uplink or the downlink of a communication network.

Returning to FIG. 2, in block 210 actual to expected results of the at least one of scheduling the first mobile device and setting network parameters based on the determined predictive model are compared. Accordingly, a system for optimizing a predictive model for mobile network communications based on historical context information includes means for comparing actual to expected results of the at least one of scheduling the first mobile device and setting network parameters based on the determined predictive model. For example, as illustrated in FIG. 3, a validation component 308 is configured to compare actual to expected results.

Returning to FIG. 2, in block 212 the predictive model is adjusted based on the comparison of actual to expected results. Accordingly, a system for optimizing a predictive model component 304 for mobile network communications based on historical context information includes means for adjusting the predictive model based on the comparison of actual to expected results. For example, as illustrated in FIG. 3, a network learning component 310 is configured to adjust the predictive model based on the comparison of actual to expected results. The validation component measures the error between actual and expect result and calculates an error. The error is utilized inside the network learning component to make adjustments to build a better future predictive model.

In one aspect, where the link between base stations provides for a high throughput, the network learning component 310 can adjust the predictive model substantially in real time. If the link between the cells is insufficient to share information on a real time basis between the cells, the network learning component 310 can adjust the predictive model less frequently.

In another aspect, at least one of persistence and controlled evolution of settings is imposed within a network including the first mobile device. Persistence is a general biasing of the algorithms within the network to either not adjust, adjust slowly, or assign a cost associated with changes. Particularly with scheduling and power control this has the effect of causing slow, gradual changes which aid in network learning.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for optimizing mobile network communications using network learning, the method comprising:
    collecting historical context data representing performance of a plurality of mobile devices operating in a plurality of cells of a mobile network,
    wherein the historical context data is collected in the plurality of cells of the mobile network, and
    wherein the historical context data includes at least one of communication environment, communication parameter estimates, mobile device statistics, mobile device transmit settings, base station receiver settings, past network statistics and settings, and adjacent network node information statistics and settings;
    building a predictive multi-cell model to optimize scheduling of network traffic in one or more cells of the mobile network based on the historical context data for the plurality of cells;
    determining a first predictive cell-level model for a first cell based at least in part on the predictive multi-cell model;
    determining a second predictive cell-level model for a second cell based at least in part on the predictive multi-cell model;
    scheduling network traffic for a mobile device in the first cell using the first predictive cell-level model for the first cell;
    scheduling network traffic for a mobile device in the second cell using the second predictive cell-level model for the second cell;
    adjusting the first predictive cell-level model to further optimize scheduling of network traffic for the first cell based at least in part on additional information from the first cell;
    adjusting the second predictive cell-level model to further optimize scheduling of network traffic for the second cell based at least in part on additional information from the second cell.

2. The method of claim 1, wherein the predictive cell-level model for the first cell is based on the historical context data collected in the first cell.

3. The method of claim 2, wherein the predictive cell-level model for the first cell is further based on the historical context data collected from cells other than the first cell.

4. The method of claim 1, wherein the additional information from the first cell is collected from a mobile device operating in the first cell.

5. The method of claim 1, wherein the additional information from the first cell is collected from a base station for the first cell.

6. The method of claim 1, wherein the additional information from the first cell includes signal-to-interference-plus-noise ratio (SINR) for the first cell.

7. The method of claim 1, wherein the additional information from the first cell is received in real time.

8. The method of claim 1, wherein adjusting the first predictive cell-level model to further optimize scheduling of network traffic for the first cell based at least in part on the additional information from the first cell occurs in real time.

9. The method of claim 1, wherein the plurality of cells of the mobile network are divided into multiple sub-networks.

10. The method of claim 9, wherein a first sub-network of the multiple sub-networks is operated independently of a second sub-network of the multiple sub-networks.

11. The method of claim 9, wherein network settings for a first sub-network of the multiple sub-networks differ from network settings for a second sub-network of the multiple sub-networks.

12. The method of claim 1, wherein different predictive cell-level models for different cells optimize latency of the network traffic, and wherein the latency is optimized differently by the different predictive cell-level models for different cells.

13. The method of claim 1, wherein different predictive cell-level models for different cells optimize bandwidth of the network traffic, and wherein the bandwidth is optimized differently by the different predictive cell-level models for different cells.

14. The method of claim 1, wherein different predictive cell-level models for different cells optimize reliability of the network traffic, and wherein the reliability is optimized differently by the different predictive cell-level models for different cells.

15. The method of claim 1, wherein different predictive cell-level models for adjacent cells are based on historical context data of each of the adjacent cells.

16. The method of claim 1, wherein scheduling network traffic for the mobile device includes optimizing performance of the mobile device based on an obstruction in an adjacent cell to the first cell.

17. The method of claim 1, wherein scheduling network traffic for the mobile device includes dynamically adjusting resource allocation based on arrival of requests from the plurality of mobile devices.

18. The method of claim 1, wherein different predictive cell-level models for different cells are verified using real-time network traffic.

19. The method of claim 1, wherein network parameters are updated for different predictive cell-level models for different cells.

20. The method of claim 1, wherein the predictive multi-cell model provides for joint decisions to be made by multiple base stations across multiple cells in the mobile network.

* * * * *